United States Patent Office 3,246,026
Patented Apr. 12, 1966

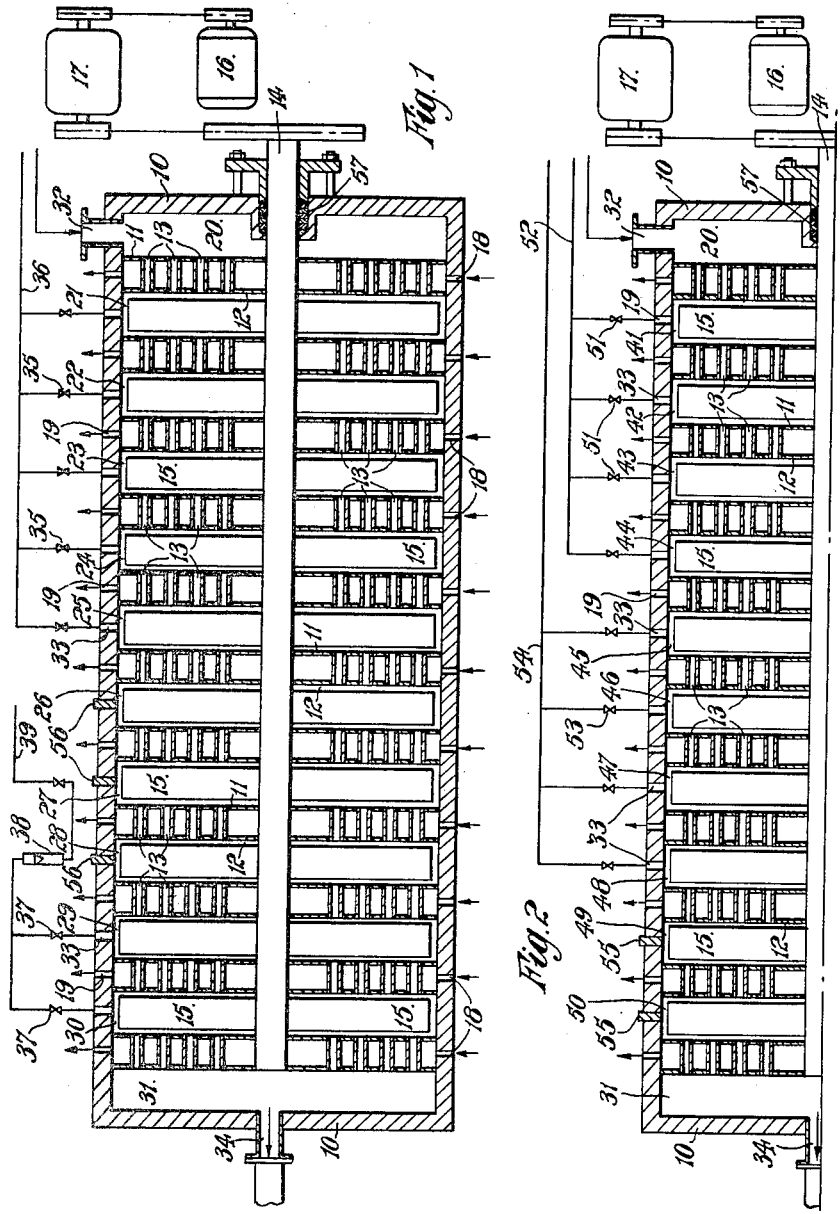

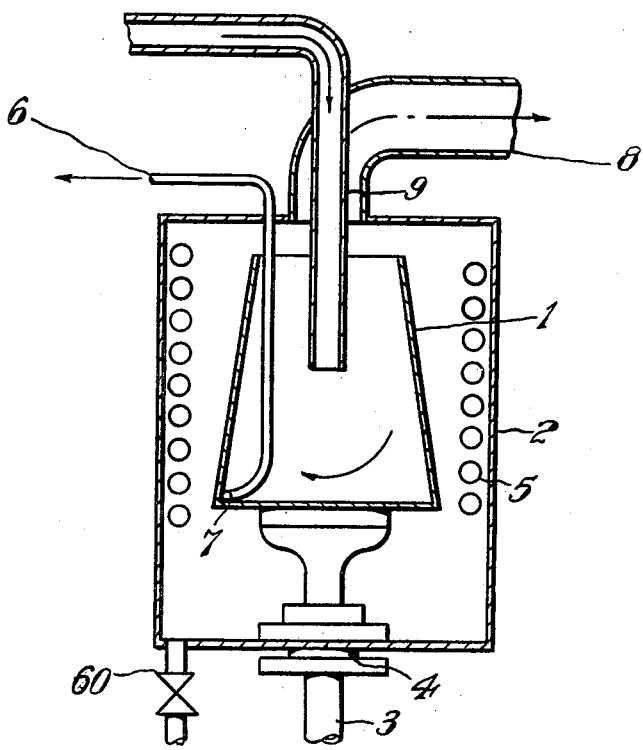

3,246,026
MANUFACTURING OF SULPHATED AND
SULPHONATED PRODUCTS
Austen Edgar Sowerby, Distington, Cumberland, and
John Robert Armstrong, Maryport, Cumberland, England, assignors, by mesne assignments, to Marchon
Products Limited, London, England
Filed Jan. 13, 1965, Ser. No. 425,317
Claims priority, application Great Britain, Jan. 14, 1964,
1,607/64
15 Claims. (Cl. 260—459)

This application is a continuation-in-part of our copending application Serial No. 189,745, filed April 24, 1962, and now U.S. Patent No. 3,200,140.

This invention relates to the sulphonation of fatty alcohols and certain derivatives thereof, and to the sulphonation of alkaryl hydrocarbons. The derivatives of fatty alcohols to which the invention may be applied are those containing fatty alcohol hydroxyl groups, e.g., glycol ethers of the formula R(OR')$_n$OH, wherein R is the residue of a fatty alcohol, R' is an alkylene group, such as

or —C$_3$H$_6$— and n has a value of from 1 to 15. Other derivatives which may be employed include the fatty acid amide derivative of lower fatty alcohols or glycol ether alkanols, which derivatives may be represented by the formulae: RCONH.R'OH and

wherein R is a group containing from 8 to 20 carbon atoms, R'OH is derived from a lower fatty alcohol such as ethyl, propyl or butyl alcohol and n has a value as from 1 to 15. The term "fatty alcohols" as used hereinafter is to be construed, where the context permits, as including derivatives thereof containing hydroxyl groups, and also mixtures of alcohols with each other and with hydroxyl-containing derivatives thereof. Likewise the term "alkaryl hydrocarbon" includes, where the context permits, mixtures of such hydrocarbons.

The sulphation of fatty alcohols and sulphonation of alkaryl hydrocarbons have hitherto been carried out by reacting the alcohol or hydrocarbon with sulphuric acid, chlorosulphonic acid or oleum. It has been proposed to sulphonate alkaryl hydrocarbons by means of sulphur trioxide, the reaction taking place in solution in liquid sulphur dioxide in a multi-compartment vessel and the sulphur trioxide being introduced separately into the compartments so that a deficiency thereof is present until the last stage of the reaction. It has also been proposed to sulphate or sulphonate organic liquids with sulphur trioxide introduced into the liquid in admixture with an inert gas so that the molecular ratio of sulphur trioxide to organic liquid is between 1:1 and 1.5:1.

In the case of the first of these proposals it was considered necessary, in order to overcome the difficulty of mixing the gaseous and liquid reactants and to achieve adequate cooling, to go to the complication of operating in liquid sulphur dioxide. We have found, however, that a satisfactory product can be obtained according to our invention by the following process; a mixture of sulphur trioxide with a diluent which is inert and gaseous in the conditions of the reaction is introduced into and intimately mixed with a liquid mass containing the alcohol or hydrocarbon flowing continuously through a reaction vessel such that at least two zones are established in the flow path of the liquid, the rate of introduction of the gas mixture relative to the mass flow rate of the alcohol or hydrocarbon being such that the molecular ratio of sulphur trioxide to alcohol or hydrocarbon is substantially less that 1 in the first zone or zones but greater than 1 in the last zone or zones, and that the volume of the gas mixture is at least several hundred times the volume of the liquid in the reactor, and the mean gas/liquid residence time in the last zone or zones being less than 1 second, whereupon the reaction is terminated by degassing the reaction mixture in a rotating bowl type of centrifugal separator.

The invention is of especial importance in its application to raw materials for use in making detergents, particularly fatty alcohols which either are heat-sensitive by virtue of their chemical constitution, for example glycol ethers and fatty acid amide derivatives of fatty alcohols, or have a high melting point, for example above 30° C. In the latter category are those fatty alcohols themselves which have more than 8 carbon atoms, for instance 16 to 18 carbon atoms. It is particularly difficult to obtain a product of satisfactory colour from such alcohols, but we have found that this can be achieved if the addition of the gaseous sulphur trioxide mixture is carried out in several zones, for example ten or more, the sulphur trioxide being present in excess only in the last few, e.g. the last two or three zones. The best results are obtained if the sulphur trioxide mixture is not introduced into one or two final zones of the reaction, the sulphur trioxide in this zone or zones being only that which is carried over from the previous zones. The latter zones may in this case be referred to as "maturing" zones although in fact completion of the reaction takes place in them.

The inert gas with which the sulphur trioxide is mixed may be any readily available gas which is inert and gaseous in the conditions of the reaction. Thus, for example, air may be used. The proportion of sulphur trioxide to inert gas may preferably be in the range 1–10%, for example 5%.

According to a feature of the invention, the temperature of the reaction mixture may be controlled in each zone of sulphur trioxide addition to a value just above, e.g. not more than 10° C. or preferably not more than 2° C. above the melting point of the mixture in that zone. To achieve the required temperature control in the rapidly flowing mixture, a high ratio of heat-exchange surface to volume of reactor is necessary. For this purpose there may be used a vessel divided into zones by partitions, baffles or the like, into each or some of which the gas containing sulphur trioxide is introduced, and each of which is maintained at the required temperature as described in our copending patent application No. 189,746, filed on April 24, 1962, and now U.S. Patent No. 3,199,-960. The ratio of the area of the heat-exchange surface to volume of reactor in such a reactor is unusually high, for example of the order of 30 sq. ft. to 1 cu. ft.

Provided the proportion of sulphur trioxide is less than stoichiometric in the early zones of the reaction and greater than stoichiometric in the later zones, it is not necessary to meter the gas supply with great accuracy. The excess of sulphur trioxide in the last zone or zones may advantageously be 2% molar or a little greater, but owing to the extremely short residence time in this zone or zones, a higher excess, e.g. up to 10%, can easily be tolerated and may indeed be advantageous to achieve a higher degree of conversion. The preferred proportion of sulphur trioxide to raw material in the early zones of the reaction increases progressively from about 15–25% in the first such zone to about 90% in the last such zone.

It is preferred that the rates of sulphur trioxide addition in the several zones be such that the reaction proceeds to about 90% of completion in the absence of an excess of sulphur trioxide, while the remainder of the reaction, for example to about 98–99% of completion, takes place with a slight excess of sulphur trioxide. Immediately thereafter the reaction is terminated by degassing, in the specified manner, i.e. in a rotating bowl centrifugal separator. If neutralisation is not carried out at this stage, it will generally be necessary later, for example if the final product is to be used as a detergent. As it is desired to minimise the quantity of alkali metal sulphate in the final product, the termination of the reaction between the sulphur trioxide and the raw material, whether it be an alcohol or a hydrocarbon, should be effected by rapid degassing to remove the excess of gaseous sulphur trioxide with the inert gas.

We have found that, if the separation of the residual sulphur trioxide gas contained in the reaction mixture is not achieved rapidly, deterioration of the products may occur, giving rise to undesirable by-products such as anhydrides and to coloured products. Furthermore, if the gas is not removed substantially completely, neutralisation of the partially degassed product gives rise to excessive inorganic matter in the final products. Rapid and complete degassing is also desirable, to enable degassed samples of the product to be obtained for control purposes. The conditions present in the reaction vessel are controlled by sampling the reaction products and subsequently varying the required parameter or parameters to correct any deviations in the quality or composition of the products. For this purpose it is desired to have available as quickly as possible substantially degassed samples of the products in which no reaction has occurred outside the reaction vessel.

The conventional method for degassing liquid/gas mixtures is to employ a cyclone separator. However, we have now found that such a separator has the disadvantage that separation of viscous reaction mixtures is incomplete and even with low viscosity mixtures reaction between the slow moving film of mixture and residual gas continues within the separator. We have found that the use of a rotating bowl type of centrifugal separator gives a rapid and substantially complete separation of the residual gas from the reaction products. The centrifugal separator for present use may be of the known type. The bowl thereof may be cylindrically shaped, but we prefer a bowl in the form of a frusto-cone, as this minimises splashing of the liquid from the bowl.

The liquid/gas reaction mixture obtained from the sulphation or sulphonation reaction vessel may be fed directly to the rotating centrifuge bowl of the separator. The gases present in the mixture separate out and are led off to a stack or may be subjected to scrubbing to recover the residual sulphur trioxide. The degassed products are continuously recovered from the bowl and may then be subjected to further treatment, such as neutralisation. By designing the separator so as to have the outlet pipe for the degassed products directed tangentially to the bowl with its orifice opposed to the direction of rotation of the liquid, it is possible to avoid the use of pumps for transferring the degassed products from the centrifuge bowl to other treatment vessels.

It is necessary to maintain the reaction mixture in the fluid state and, where necessary, the centrifuge bowl may be heated for this purpose. The heating may be supplied by conventional means, such as steam coils.

In some cases when dealing with highly viscous reaction mixtures it may be desirable to operate the centrifuge under reduced pressures in order to aid the degassing of the mixture. In order to achieve this the centrifuge may be mounted within an enclosure and the reduced pressure obtained by vacuum pump, suction fan, or other conventional means. The enclosure not only permits the use of reduced pressures but also prevents scattering over the work place of any reaction mixture which may splash over the lip of the bowl. For this reason and also because it prevents atmospheric moisture reaching the partially degassed products, it is preferred to mount the centrifuge within an enclosure, even if operation under reduced pressure is not necessary.

Where a neutral product is required, and the termination of the sulphonation or sulphation reaction has not involved neutralisation, the product of the degasification process may be neutralised at leisure with an aqueous alkali.

The residence time of the reactants in the last zones in which there is an excess of sulphur trioxide is critical. As stated above, the mean gas/liquid residence time in these zones is less than 1 second, but preferably may be as small as 0.1 second. The residence time in the earlier zones is not critical, but advantageously the residence time for the whole reaction is less than 2 seconds. Preferably also the overall time from the beginning of the reaction to the end of the terminal process of degassing, is less than 4 seconds.

It is an advantage of the process according to the invention that, since the sulphur trioxide is greatly diluted by the inert gas, and the mixture enters the reactor at each zone, or at least at each of the earlier zones, the concentration of sulphur trioxide in the gas mixture in the last zones, at which the substantially completely reacted product is most sensitive, is considerably reduced. Moreover since the volume of the gas mixture is much larger than that of the liquid, e.g. at least 400 times as great and usually of the order of 1000 times as great, the residence time of the gas/liquid mixture decreases from one zone to the next, and is therefore smallest where the liquid mixture is most sensitive.

If desired the raw material fed into the reactor may contain a proportion of already sulphated or sulphonated product.

It is possible using the invention to effect a good control of the process. This is due to the fact that the volume and the residence time of the reaction mixture at any stage of the process are small, so that a control signal derived from a sample taken at any desired point in the flow path of the reactants and fed back to the parameter or parameters to be controlled becomes effective (after a small time lag) on the whole volume of reaction mixture. The property of the sample of reaction mixture to be measured may be the viscosity or the specific gravity of the liquid after removal of the gas entrained therein.

The apparatus for carrying out the invention may advantageously be as described in our aforesaid patent application, wherein the reaction products are fed to a centrifugal separator. This has the important characteristic of a large area of cooling surface in relation to the volume of the reaction space. In addition to enabling more rapid and uniform cooling to be effected, this characteristic has the further advantage that for a given degree of cooling, a warmer cooling medium may be used, thus reducing the tendency for a solid insulating film of the raw material to be deposited on the heat-exchange surfaces.

Instead of the apparatus just referred to, any other apparatus may be used in which (a) the liquid raw material can be made to flow through a number of chambers or partitioned zones of a vessel, (b) the sulphur trioxide gas mixture can be introduced at predetermined rates into each chamber or zone, (c) the liquid and gas phases are initimately mixed throughout, (d) cooling means are provided for controlling the temperature of the reaction mixture to a predetermined value in each chamber or zone, (e) the area of the cooling surface is large in relation to the volume of the reaction space, (f) the reaction product is rapidly degassed in a rotating bowl type of centrifugal separator. An example of apparatus fulfilling these requirements comprises a series of reaction chambers joined by injector pumps in which the injector gas is the sulphur trioxide gas mixture, the requisite cooling being effected as the reaction mixture flows between the successive injector nozzles, the outlet of the reaction chambers leading to a centrifugal separator. Instead of a series of injectors, any other suitable kind of multistage pump may be used.

Examples of a sulphonation and sulphation reaction according to the invention and reactors for use therein will now be described with reference to the accompanying drawings in which FIG. 1 is a diagrammatic sectional elevation of a reactor for the sulphonation of alkyl benzenes, FIG. 2 is a similar view of the upper portion of a reactor for the sulphation of fatty alcohols, and FIG. 3 is a vertical sectional elevation of the centrifugal separator.

Referring to FIG. 1, the reactor 10 is cylindrical in shape and is divided into twelve chambers by eleven hollow baffle plates, each of which consists of parallel perforated plates 11 and 12 and a plurality of tubes 13 welded into the perforations. A shaft 14 journalled in bearings 57 passes through all the plates 11 and 12, liquid-tight seals (not shown) being provided at each plate. Fixed on the shaft 14 are agitator blades 15, each of which is situated with a small clearance between adjacent hollow baffle plates. The shaft 14 is driven by a motor 16 through a variable speed gear box 17.

Each hollow baffle plate is provided with an inlet 18 and an outlet 19 each inlet and outlet being connected in an independent circuit (not shown) for the circulation of a cooling fluid, in the present case water.

The chambers into which the reactor is divided by the hollow baffle plates 11, 12, 13 comprise an inlet chamber 20, reaction chambers 21, 22, 23, 24, 25, 26, 27, and 28, quenching chambers 29 and 30 and an exit chamber 31. The inlet chamber 20 is provided with an inlet pipe 32 for the raw material to be sulphonated, in the present example dodecyl benzene. Each of chambers 21-30 is provided with a plurality of inlets such as 33 distributed round the circumference of the reactor wall. The exit chamber is provided with an outlet pipe 34 for the reaction product, dodecyl benzene sulphonate, leading to a centrifugal separator.

The inlets 33 of chambers 21-25 are connected via cocks 35 with a pipe 36 for the supply of a mixture of sulphur trioxide and dry air. The inlets 33 of chambers 26-28 are closed by plugs 56. The inlets 33 of chambers 29 and 30 are connected via cocks 37 and a rotameter 38 with a pipe 39 for the supply of quenching water.

Referring now to FIG. 3, the reaction vessel of FIG. 1 is connected to a frusto-conical centrifuge bowl 1 which is rotatably mounted within an enclosure 2 and driven by a shaft 3 which passes through bearing glands 4 in the base of the enclosure 2. The enclosure is provided with: steam coils 5 to provide heat when necessary to the bowl 1; an outlet pipe 6 which reaches into the basal periphery of the bowl 1 and is directed tangentially to the bowl with its orifice 7 opposed to the direction of rotation; a gas vent pipe 8 which is vented to atmosphere via a scrubbing stack (not shown); an inlet pipe 9 for the material to be degassed which is positioned substantially on the axis of rotation of the bowl 1 and reaches into the interior of the bowl; and a drain 10.

In operation the bowl is rotated and the material to be degassed is fed into the bowl via the inlet pipe 9. The centrifugal force causes separation of the gas from the mixture and drives the material to the wall of the bowl where separation of the gas and liquid is completed. The gas escapes from the enclosure via the gas vent pipe 8 and passes to the scrubber stack where the $SO_3$ entrained therein is removed by acid scrubbing before the gases are vented to the atmosphere. Heat may be applied to the bowl by means of the steam coils 5 so that the material in the bowl is fluid at all times. By virtue of the inclination of the walls of the bowl the degassed product is driven to the bottom of the bowl where it is collected by the outlet pipe 6. Since the pipe is directed tangentially to the bowl and its orifice 7 is opposed to the direction of rotation the momentum of the rotating fluid forces part of the liquid up the tube 6 and provides the necessary force to transfer the degassed fluid to a neutraliser which is not shown. Any of the fluid which may be splased over the lip of the bowl is removed from the enclosure 2 via the drain 60.

Referring now to FIG. 2, like parts of which are denoted by the same reference numerals as those of FIG. 1, the hollow baffle plates 11, 12, 13 again divide the reactor 10 into twelve chambers. The latter comprise an inlet chamber 20, an exit chamber 31 and ten chambers 41-50. The fatty alcohol, in the present example lauryl alcohol, is supplied to chamber 20 by pipe 32, and the sulphated product is withdrawn from the exit chamber 31 by pipe 34 and passed to a centrifugal separator.

The inlets 33 of chambers 41-44 are connected via cocks 51 with a pipe 52 for the supply of a certain mixture of sulphur trioxide and air. Inlets 33 of chambers 45-48 are connected via cocks 53 with a pipe 54 for the supply of a different sulphur trioxide/air mixture. Inlets 33 of chambers 49 and 50 are closed by plugs 55.

The reaction vessel of FIG. 2 was connected to a centrifuge separator as shown in FIG. 3 and described above.

The operation of the reactor shown in FIGS. 2 and 3 will be described below under "Example 1 to 4."

The invention is illustrated by the following examples in which all percentages are on a weight basis:

EXAMPLE 1

Commercial lauryl alcohol was delivered by means of a metering pump and at a flow rate of 180 lbs. per hour to the first chamber of a multi chamber reactor similar to those shown in the accompanying drawings and comprising 10 reaction chambers separated from each other by hollow baffle plates serving as heat-exchangers, giving a total heat transfer surface of 10 sq. ft. Each chamber was provided with an agitator and chambers 1 to 8 were each provided with four gas injection ports. A converter gas stream containing 5.6% by volume of sulphur trioxide was delivered by means of a rotary compressor at a rate of 7200 standard cubic feet per hour to a manifold from which it was fed at accurately metered flow rates to the injection ports of reaction chambers Nos. 1-8. The gas flow rates were adjusted in such a manner that 40% of the total gas volume entered chambers 1 and 2, and 10% of the total volume entered each of chambers 3 to 8. Reaction was about 90% complete in chamber No. 7. No sulphur trioxide was admitted to chambers 9 and 10 which were employed as maturing zones in which the reaction was carried to 98-99.5% conversion.

The reaction temperature in each chamber was carefully regulated by adjusting the flow rate of the cooling water passing through each of the heat transfer plates and the substantially completely reacted product emerged from chamber No. 10 at a temperature of 32° C. In this manner, therefore, the lauryl alcohol was sulphated progressively in successive reaction chambers with sulphur trioxide contained in a carrier gas stream. At the same time the concentration of the sulphur trioxide gas stream in successive reaction chambers was progressively reduced by means of the diluting effect of the carrier gas stream issuing from the preceding chamber or chambers. The mean gas/liquid residence time in successive chambers 1 to 8 was progressively reduced by virtue of the increase in the ratio of gas to liquid occurring in each chamber. Sulphur trioxide was present in proportions greater than stoichiometric in reaction chamber No. 8 and maturing chambers 9 and 10 only for a total residence time of about one-fifteenth of a second and the total residence time in the reactor was about 0.3 second.

The mixture of substantially completely reacted product, carrier gas and unreacted sulphur trioxide which emerged from the reactor was passed into a rotating bowl of centrifugal separator as shown in FIG. 3, wherein the gaseous components of the mixture were separated and passed to an absorption tower. The liquid acid end-product issuing from the separator was neutralised immediately in aqueous alkali to give an aqueous solution of sodium lauryl sulphate of exceptionally good colour and having the following composition:

| | Percent |
|---|---|
| Sodium lauryl sulphate | 27.0 |
| Unsulphated alcohol | 0.21 |
| Sodium sulphate | 0.79 |
| Water | 72.0 |

EXAMPLE 2

The equipment was identical with that described in Example 1. Commercial dodecyl benzene was delivered to the first chamber of the reactor at a controlled flow rate of 240 lbs. per hour and a gas stream containing 5.6% of sulphur trioxide was delivered to the distribution manifold at a controlled rate of 7200 standard cubic feet per hour. The gas distribution into successive reaction chambers and the mean gas/liquid residence times and sulphur trioxide concentrations therein were identical with those described in Example 1. The flow rate of the cooling water supplied to the heat-exchange plates was adjusted in order to control the temperature in each of the reaction and maturing chambers to a value in the range 50°–60° C., and the temperature of the substantially reacted alkyl benzene emerging from chamber No. 10 was about 55° C. The mixture of liquid reaction product, carrier gas and unreacted sulphur trioxide which emerged from the reactor was passed into a centrifugal separator wherein the gaseous components were separated and led to an absorption tower. The liquid dodecyl benzene sulphonic acid emerging from the separator passed into a receiving tank wherein a small amount of water was introduced to quench the reaction and prevent colour deterioration under storage conditions. The dodecyl benzene sulphonate produced in this manner was of exceptionally good colour and had the following composition:

| | Percent |
|---|---|
| Dodecyl benzene sulphonic acid | 96.2 |
| Unsulphonated oil | 0.97 |
| Free sulphuric acid | 2.12 |
| Water | 0.7 |

EXAMPLE 3

A liquid detergent raw material comprising commercial lauryl alcohol reacted with 2 moles of ethylene oxide per mole was delivered by means of a metering pump at a flow rate of 270 lbs. per hour to the first chamber of a multi chamber reactor similar to those shown in the accompanying drawings and comprising 10 reaction chambers separated from each other by hollow baffle plates serving as heat-exchangers, giving a total heat transfer surface of 10 sq. ft. Each chamber was provided with an agitator and chambers 1 to 8 were each provided with four gas injection ports. A converter gas stream containing 5.6% by volume of sulphur trioxide was delivered by means of a rotary compressor at a rate of 7200 standard cubic feet per hour to a manifold from which it was fed at accurately metered flow rates to the injection ports of reaction chambers Nos. 1–8. The gas flow rates were adjusted in such a manner that 40% of the total gas volume entered chambers 1 and 2, and 10% of the total volume entered each of chambers 3 to 8. Reaction was about 90% complete in chamber No. 7. No sulphur trioxide was admitted to chambers 9 and 10 which were employed as maturing zones in which the reaction was carried to 98–99.5% conversion.

The reaction temperature in each chamber was carefully regulated by adjusting the flow rate of the cooling water passing through each of the heat transfer plates and the substantially completely reacted product emerged from chamber No. 10 at a temperature of 32° C. In this manner, therefore, the lauryl alcohol was sulphated progressively in successive reaction chambers with sulphur trioxide contained in a carrier gas stream. At the same time the concentration of the sulphur trioxide gas stream in successive reaction chambers was progressively reduced by means of the diluting effect of the carrier gas stream issuing from the preceding chamber or chambers. The mean gas/liquid residence time in successive chambers 1 to 8 was progressively reduced by virtue of the increase in the ratio of gas to liquid occurring in each chamber. Sulphur trioxide was present in proportions greater than stoichiometric in reaction chamber No. 8 and maturing chambers 9 and 10 only for a total residence time of about one-fifteenth of a second and the total residence time in the reactor was about 0.3 second.

The mixture of substantially completely reacted product, carrier gas and unreacted sulphur trioxide which emerged from the reactor was passed into a centrifugal separator, wherein substantially complete separation of the liquid and gaseous components was achieved. The liquid acid end-product issuing from the separator was a transparent liquid substantially free from entrained gases, and was neutralised immediately to give a pale yellow liquid of the following composition:

| | Percent |
|---|---|
| Sodium lauryl sulphate | 27.0 |
| Unsulphated alcohol | 0.21 |
| Sodium sulphate | 0.79 |
| Water | 72.0 |

EXAMPLE 4

Commercial lauryl alcohol was continuously supplied to the inlet chamber of the reactor shown in FIG. 2 at a rate of 180 lb. per hour. A carrier gas stream containing 5% by volume of sulphuric trioxide vapour and 95% of dry air was delivered at the rate of 5000 standard cubic feet per hour to reaction chambers Nos. 41–44 and a stream containing 2% by volume of sulphur trioxide vapour and 98% of dry air was delivered at the rate of 5500 standard cubic feet per hour to reaction chambers Nos. 45–48. The reactants flowed through the reaction vessel as described in Example 1.

About 70% of the lauryl alcohol was converted to lauryl sulphate in reaction chambers Nos. 41–44 and in reaction chamber No. 48 conversion to lauryl sulphate was nearly complete.

From the final reaction chamber No. 48 the lauryl sulphate passed into the reaction chambers Nos. 49 and 50 (herein referred to as "maturing chambers") where the temperature was reduced to 20°–22° C. at which temperature chemical and colour degradations of the lauryl sulphate were minimised.

The mixture of carrier gas and lauryl sulphate which issued from the exit chamber was passed into a continuous separator wherein the gaseous components were separated and led to an absorption tower. The liquid reaction product which issued from the separation was then neutralised with aqueous alkali. The reaction product was a pale yellow liquid containing approximately:

| | Percent |
|---|---|
| Sodium lauryl sulphate | 19.3 |
| Unsulphated fatty alcohols | 0.43 |
| Sodium sulphate | 0.98 |
| Water | 79.29 |

*Comparative experiment*

A liquid detergent raw material comprising commercial lauryl alcohol reacted with two moles of ethylene oxide per mole, was delivered by means of a metering pump and at a flow rate of 270 lbs./hr. to the first chamber of a multi chamber reactor similar to those shown in the accompanying drawings. The material was sulphated in substantially the same manner as described in Example 3, with a converter gas stream containing 5.6% by volume of sulphur trioxide.

The mixture of substantially completely reacted product, carrier gas, and unreacted sulphur trioxide which emerged from the reactor, was passed into a conventional cyclone separator wherein the gaseous components of the mixture were separated. This separation was, however, incomplete and the end-product issued from the cyclone in the form of a viscous foam containing about 50% by volume of entrained gases. This mixture of liquid reaction product and entrained gases was neutralised immediately in aqueous alkali to give a viscous and highly gasified mass which de-aerated slowly on settling at 50° C. to give an amber coloured liquid having the following composition:

| | Percent |
|---|---|
| Sodium lauryl ether sulphate | 25.3 |
| Unreacted lauryl ether | 1.09 |
| Sodium sulphate | 1.73 |
| Water | 71.88 |

The conditions obtaining in the reaction chambers in Examples 1, 2 and 4 are set out in the following table:

| Example | Chamber No. | SO₃ Carrier gas Concentration, Percent | SO₃:Raw Material, Percent of Stoichiometric | Residence Time, Secs./100 | Temperature, °C. |
|---|---|---|---|---|---|
| 1 | 1 | 5.6 | 22.2 | 8 | 39 |
| | 2 | 2.8 | 44.4 | 4 | 45 |
| | 3 | 1.12 | 55.2 | 3 | 40 |
| | 4 | 0.93 | 66.25 | 2.5 | 38 |
| | 5 | 0.8 | 77.5 | 2 | 39 |
| | 6 | 0.7 | 88.5 | 2 | 38 |
| | 7 | 0.62 | 99.5 | 2 | 37 |
| | 8 | 0.56 | 111 | 1.5 | 38 |
| | 9 | 0.56 | 111 | 1.5 | 35 |
| | 10 | 0.56 | 111 | 1.5 | 32 |
| Total | | | | 28.0 | |
| 2 | 1 | 5.6 | 22.8 | 8 | 50-60 |
| | 2 | 2.8 | 45.5 | 4 | 50-60 |
| | 3 | 1.12 | 56.8 | 3 | 50-60 |
| | 4 | 0.93 | 67.3 | 2.5 | 50-60 |
| | 5 | 0.8 | 79.8 | 2 | 50-60 |
| | 6 | 0.7 | 90.8 | 2 | 50-60 |
| | 7 | 0.62 | 102 | 2 | 50-60 |
| | 8 | 0.56 | 114 | 1.5 | 50-60 |
| | 9 | 0.56 | 114 | 1.5 | 50-60 |
| | 10 | 0.56 | 114 | 1.5 | 50-60 |
| Total | | | | 28.0 | |
| 4 | 1 | 5 | 17.5 | 9 | 35 |
| | 2 | 2.5 | 35 | 5 | 40 |
| | 3 | 1.66 | 52.5 | 3 | 45 |
| | 4 | 1.25 | 70.0 | 2 | 30 |
| | 5 | 0.433 | 77.5 | 2 | 25 |
| | 6 | 0.355 | 85 | 1.5 | 22 |
| | 7 | 0.30 | 92.5 | 1 | 24 |
| | 8 | 0.262 | 101 | 1 | 25 |
| | 9 | 0.15 | 101 | 1 | 22 |
| | 10 | 0.1 | 101 | 1 | 21 |
| Total | | | | 26.5 | |

What we claim is:

1. A method of sulphating and sulphonating respectively a detergent raw material selected from the group consisting of saturated fatty alcohols and mononuclear alkaryl hydrocarbons which comprises: continuously flowing a liquid mass containing said material through a partitioned reaction vessel having at least two interconnecting reaction zones established in the flow path of the liquid, introducing into each of said zones a mixture of sulphur trioxide and a diluent which is inert and gaseous under the conditions of the reaction, said zones being controlled at a temperature just above the melting point of the reactants whereby the liquid flows freely through the respective zones, and intimately mixing said gas mixture with said liquid to react said sulphur trioxide and said material, said gas mixture being introduced into said liquid such that the molecular ratio of sulphur trioxide to said material is substantially less than 1 in the first of said zones and greater than 1 in the later of said zones, the volume of said gas mixture being at least 400 times the volume of said liquid in the reactor, the mean gas-liquid residence time in said later zone being less than about 1 second, and degassing the reaction mixture in a rotating bowl type of centrifugal separator.

2. A method as defined in claim 1 wherein said temperature is not more than 10° C. above the melting point of the reactants in the respective zone.

3. A method as defined in claim 1 wherein the residence time of the reactants through the whole of the reaction with sulphur trioxide and the overall time from the beginning of the reaction to the end of the degassing process is less than 4 seconds.

4. A method as defined in claim 1 wherein said partitions contain heat-exchange surfaces which sub-divide the reactor into said zones, and the ratio of the heat-exchange surface area to the volume of the reaction vessel is about 30 sq. ft. per cu. ft.

5. A method as defined in claim 1 wherein the said alkaryl hydrocarbon is dodecyl benzene.

6. A method as defined in claim 1 wherein the alcohol is selected from the group consisting of lauryl alcohol and the condensation product of lauryl alcohol with 2 molar proportions of ethylene oxide.

7. A method as defined in claim 1, wherein there are at least 10 of said zones, said sulphur trioxide being present in excess in the last two zones.

8. A method as defined in claim 7 wherein the sulphur trioxide gas mixture is introduced only into the zones in which there is a stoichiometric deficiency of sulphur trioxide.

9. A method as defined in claim 7 wherein the excess of sulphur trioxide in the last zone is less than about 10% of the stoichiometric value.

10. A method as defined in claim 7 wherein the deficiency of sulphur trioxide in the first zone is in the range of from about 50 to 5% of the stoichiometric value.

11. A method of sulphating and sulphonating respectively a detergent raw material selected from the group consisting of saturated fatty alcohols and mononuclear alkaryl hydrocarbons which comprises: continuously flowing a liquid mass containing said material through a partitioned reaction vessel having at least two interconnecting reaction zones established in the flow path of the liquid, introducing into each of said zones a mixture of sulphur trioxide and a diluent which is inert and gaseous under the conditions of the reaction, said zones being controlled at a temperature just above the melting point of the reactants whereby the liquid flows freely through the respective zones, and intimately mixing said gas mixture with said liquid to react said sulphur trioxide and said material, said gas mixture being introduced into said liquid such that the molecular ratio of sulphur trioxide to said material is substantially less than 1 in the first of said zones and greater than 1 in the later of said zones, the volume of said gas mixture being at least 400 times the volume of said liquid in the reactor, the mean gas-liquid residence time in said later zone being less than about 1 second, passing the reaction mixture into a rotating bowl to degas the mixture, removing the gases present in the reaction mixture as they separate out, and recovering the degassed product through an outlet arranged tangentially to the bowl with its orifice opposed to the direction of rotation of the product.

12. A method as defined in claim 11 wherein the bowl is maintained under vacuum.

13. A method as defined in claim 11 wherein the bowl is of frusto-conical shape.

14. A method as defined in claim 11 wherein the temperature in the bowl is maintained just above the melting point of the product therein.

15. A method as defined in claim 11 wherein the recovered product is neutralized with an aqueous alkali.

References Cited by the Examiner

UNITED STATES PATENTS

| | | | |
|---|---|---|---|
| 2,697,031 | 12/1954 | Hervert | 260—459 |
| 2,768,199 | 10/1956 | Luntz et al. | 260—686 X |
| 2,845,455 | 7/1958 | Brown | 260—686 X |
| 2,863,912 | 12/1958 | Smith | 260—686 X |
| 3,097,234 | 7/1963 | Graham et al. | 260—686 X |

FOREIGN PATENTS 808,394   2/1959   Great Britain.

CHARLES B. PARKER, *Primary Examiner.*

FLOYD D. HIGEL, *Assistant Examiner.*